United States Patent
Hughes et al.

(10) Patent No.: US 6,406,398 B1
(45) Date of Patent: Jun. 18, 2002

(54) TRANSMISSION FOR RACING AUTOMOBILES

(76) Inventors: Dan Hughes, 4185 Foxwood Dr., Shingle Springs, CA (US) 95682; Jack Shell, 10461 Baseline Rd., Elverta, CA (US) 95626

( * ) Notice: Subject to any disclaimer, the term of this patent is extended or adjusted under 35 U.S.C. 154(b) by 0 days.

(21) Appl. No.: 09/640,497

(22) Filed: Aug. 16, 2000

Related U.S. Application Data

(60) Provisional application No. 60/149,532, filed on Aug. 17, 1999.

(51) Int. Cl.$^7$ .............................................. F16H 31/00
(52) U.S. Cl. ..................................................... 475/116
(58) Field of Search .................................. 475/116, 144

(56) References Cited

U.S. PATENT DOCUMENTS

| | | | | |
|---|---|---|---|---|
| 4,883,151 A | * | 11/1989 | Tobler | 192/4 A |
| 5,050,716 A | * | 9/1991 | Christensen | 192/3.23 |
| 5,090,528 A | * | 2/1992 | Massel | 192/3.34 |
| 5,782,326 A | * | 7/1998 | Souza | 192/3.26 |

* cited by examiner

Primary Examiner—Dirk Wright

(57) ABSTRACT

An automotive transmission of the invention comprises a single transmission case, an anti-lockup assembly positioned within the case, a planetary gear set assembly positioned within the case and coupled directly to the anti-lockup assembly, a braking assembly positioned to apply braking force directly to the anti-lockup assembly, and a valve assembly located externally from the transmission case. An input assembly is coupled to the anti-lockup assembly proximate to the front end of the case which allows coupling of the transmission of the invention directly to a torque converter. A fluid pump is included in the input assembly. The anti-lockup assembly preferably comprises a safety sprag clutch, an inner sprag race, and an outer sprag race, with the sprag clutch positioned between the inner and outer sprag races. The planetary gear set assembly preferably comprises a conventional planetary gear set which couples directly to the outer sprag race. The brake assembly preferably comprises a transbrake clutch configured to frictionally engage or interact with the outer sprag race upon brake activation. The input assembly preferably comprises an input shaft, coupled to the inner sprag race, extends forward from the transmission case to allow coupling to a torque converter. The input assembly further comprises a fluid pump assembly, and front plate associated with the input shaft. The front plate couples to the front of the transmission case to retain the sprag clutch and brake assembly therein. A stator support coupled to the front plate rotationally supports the input shaft, while the fluid pump assembly is coupled to the stator support. The input shaft couples to a torque converter turbine. A housing for the torque converter assembly may be coupled directly to the front end of the transmission case.

20 Claims, 4 Drawing Sheets

TRANSMISSION FOR RACING AUTOMOBILES

RELATED APPLICATION DATA

This application is entitled to the benefit of U.S. Provisional Patent Application Ser. No. 60/149,532 filed Aug. 17, 1999.

BACKGROUND OF THE INVENTION

1. Field of the Invention

This invention pertains to transmission devices and systems for racing automobiles, and more particularly to a transmission for use in drag racing wherein quick reaction times at the starting line and maximum acceleration are primary to success. More particularly, the invention is a racing automotive transmission, with an integral anti-lockup assembly, which is compact, lightweight, and configured for quick and easy disassembly and repair. The use of a torque converter with the invention allows a racing vehicle using the invention to be held stationary on the starting line with the engine at maximum torque by utilizing a transmission brake, and then instantly allows the vehicle to accelerate.

2. Background

In automobile racing generally, and drag racing in particular, the use of high horsepower engines and the resulting high drive loads require specialized transmissions. Drag racing transmissions must be able to provide maximum acceleration immediately from the start of a race and continuing throughout the race, under high drive load, and with minimal interruption during gear shifting.

Currently, there are two types of after-market automotive drive systems available that allow the use of a torque converter with a racing planetary gear set. In both cases the drive systems are stand-alone units to which a complete planetary transmission is attached, making the assemblies large and heavy. In one of the currently available drive systems, the valving is located inside the case and concentric to the input shaft, thus requiring complete removal of the drive system from the vehicle and complete disassembly for servicing. This system is further deficient in that it has a relatively small clutch pack for the transmission brake, with the frictions driven by a clutch hub splined to the output shaft of the system. This arrangement makes the system unable to hold large amounts of engine torque and further requires that the system be quite long and bulky.

The other currently available after-market drive system does not contain a safety sprag clutch, making it possible for the rear tires of a vehicle to lock-up in the event of an engine failure, which could cause the vehicle to crash. The transmission brake is a band surrounding a drum, which is activated by compressed $CO_2$ from an external bottle. Varying $CO_2$ pressures and the requirement of large amounts of $CO_2$ use each time the reverser is shifted via activation of the transmission brake makes this system inconsistent and it requires constant service.

Accordingly, there is a need for a transmission that is small and light in weight while remaining strong and durable, that is readily serviceable with as much service as possible being accomplished without requiring removal from vehicle or substantial disassembly, that contains a safety clutch to provide a disconnect from the engine to the drive wheels in the event of an engine failure, and which is self-contained, requiring no external fluid or gas pressure for operation. The present invention satisfies these needs, as well as others, and generally overcomes the deficiencies found in the background art.

SUMMARY OF THE INVENTION

The present invention is an automotive transmission, with an integral anti-lockup assembly included therein, which is compact, light in weight, and which can be quickly and easily disassembled for maintenance and repair. The invention incorporates a racing planetary gear set and shifting mechanism, along with a fluid pump and regulation system, and a transmission brake and safety sprag clutch assembly, inside a single common case which is compact and short in length. The invention is capable of being changed from a two speed transmission to a three or four speed assembly in a manner of minutes by removing the reverser unit and attaching another planetary gear set in it's own housing and then reinstalling the reverser unit. Shifting of the transmission can be through manual, hydraulic, or pneumatic means.

In its most general terms, the automotive transmission of the invention comprises a single transmission housing or case, an anti-lockup assembly positioned within the transmission case, a planetary gear set assembly positioned within the transmission case and coupled directly to the anti-lockup assembly, a braking assembly positioned to apply braking force directly to the anti-lockup assembly, and a valve assembly located externally from the transmission case. An input assembly is coupled to the anti-lockup assembly proximate to a front end of the transmission case which allows coupling of the transmission of the invention directly to a torque converter. A fluid pump is included in the input assembly.

By way of example, and not necessarily of limitation, the anti-lockup assembly preferably comprises a safety sprag clutch, an inner sprag race, and an outer sprag race, with the sprag clutch positioned between the inner and outer sprag races. The planetary gear set assembly preferably comprises a conventional planetary gear set which couples directly to the outer sprag race.

The brake assembly preferably comprises a transbrake clutch pack and associated piston, with the transbrake clutch pack being structured and configured to frictionally engage or interact with the outer sprag race upon brake activation. The transmission brake clutch pack includes a plurality of alternating friction plates which are splined to the outer diameter of the outer sprag race, and separator plates located and held against rotation by pins in the transmission case.

The input assembly preferably comprises an input shaft, coupled to the inner sprag race, which extends forward from the transmission case to allow coupling to a torque converter. The input assembly further comprises a fluid pump assembly, and front plate associated with the input shaft. The front plate couples to the front of the transmission case to retain the sprag clutch and brake assembly therein. A stator support coupled to the front plate rotationally receives the input shaft, while the fluid pump assembly is mounted on the stator support. The input shaft couples to a torque converter assembly. A housing for the torque converter assembly may be coupled directly to the front end of the transmission case.

The anti-lockup assembly and brake assembly are directly mounted to the front end of the transmission case, while the planetary gear set assembly is mounted directly to the back end of the transmission case. A partition or wall in the case separates the anti-lockup and planetary gear set assemblies. A splined element on the outer sprag clutch engages a corresponding splined input in the planetary gear set proximate to the partition. The splined element, which is physically part of the outer sprag race, transmits rotational energy from the input shaft and sprag clutch assembly to the planetary gear set of the transmission. This arrangement allows the racing transmission of the invention to be more compact and shorter in length than in previously available stand-alone drive units or systems.

The valve assembly preferably comprises a valve body which couples to the bottom of the transmission case. An oil pan also couples to the bottom of the transmission case to cover the valve body and provide an oil reservoir for the valve body. The valve body includes a plurality of oil channels which communicate with inlet and outlet openings in the bottom of the transmission case and with the oil reservoir in the oil pan. A transbrake solenoid in the valve body operates a spool valve in the valve body. The transmission braking provided by the invention is applied by the application of hydraulic pressure behind the piston of the brake assembly, which moves to apply pressure to the transmission brake clutch pack. The hydraulic pressure is controlled by the spool valve and transbrake solenoid, which is remotely actuated by the driver.

It is preferable, but not necessary, to incorporate the safety sprag clutch into the transmission of the invention. The safety sprag clutch allows disengagement of the engine from the transmissions planetary gear set to prevent the lock-up of the rear wheels of the vehicle in the event of an engine failure, and thus is preferred. In embodiments of the invention wherein the sprag clutch is omitted, a brake element structured in the manner of the outer sprag race may be coupled directly to the input shaft, with the transbrake clutch pack acting directly upon the brake element.

A separate reversing planetary gear set assembly is coupled to the planetary gear set proximate the back end of the transmission case to allow for selecting forward, neutral and reverse gears. This reverser assembly is directly mounted to the rear of the transmission case. By removing the reverser assembly, easy access to the planetary gear set for service or the changing of gear ratios is provided. Also, by removing the reverser, additional racing planetary gear assemblies can be mounted to the rear of the transmission of the invention, thereby allowing conversion of the transmission from a standard two-speed unit to one of three, four, or five forward speeds. The reverser is remounted to the final planetary assembly following such conversion.

The positioning of the brake assembly around the outer sprag race, and the coupling of the outer sprag race directly to the planetary gear set, results in a short, compact drive path and correspondingly allows the transmission of the invention to be compact and light weight. The configuration of the transbrake clutch pack around the relatively large surface area provided by the outer sprag clutch additionally provides a larger braking surface area for better braking, and allows transfer of substantial amounts of engine torque. The location of the valve assembly externally from the transmission housing within the oil pan allows quick and easy access to the valves without requiring any disassembly of the transmission itself.

An object of the invention is to provide a racing car transmission apparatus which is compact and light weight.

Another object of the invention is to provide a racing car transmission apparatus which includes a safety sprag clutch assembly to prevent rear wheel lock-up in the event of engine failure, which may lead to a vehicle crash.

Another object of the invention is to provide a racing car transmission apparatus which has externally located valving for easy access without requiring disassembly of the transmission.

Another object of the invention is to provide a racing car transmission apparatus which allows transfer of high levels of engine torque.

Another object of the invention is to provide a racing car transmission apparatus which includes a large transbrake clutch pack for effective braking.

Another object of the invention is to provide a racing car transmission apparatus which eliminates the need for an output shaft between a sprag clutch assembly and a planetary gear set.

Another object of the invention is to provide a racing car transmission apparatus which allows quick and easy detachment and re-attachment of a reverser assembly for conversion of the transmission to different speeds.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWING

The invention will be more fully understood by reference to the following drawing, which is for illustrative purposes only.

DETAILED DESCRIPTION OF THE PREFERRED EMBODIMENTS

Figure 1:
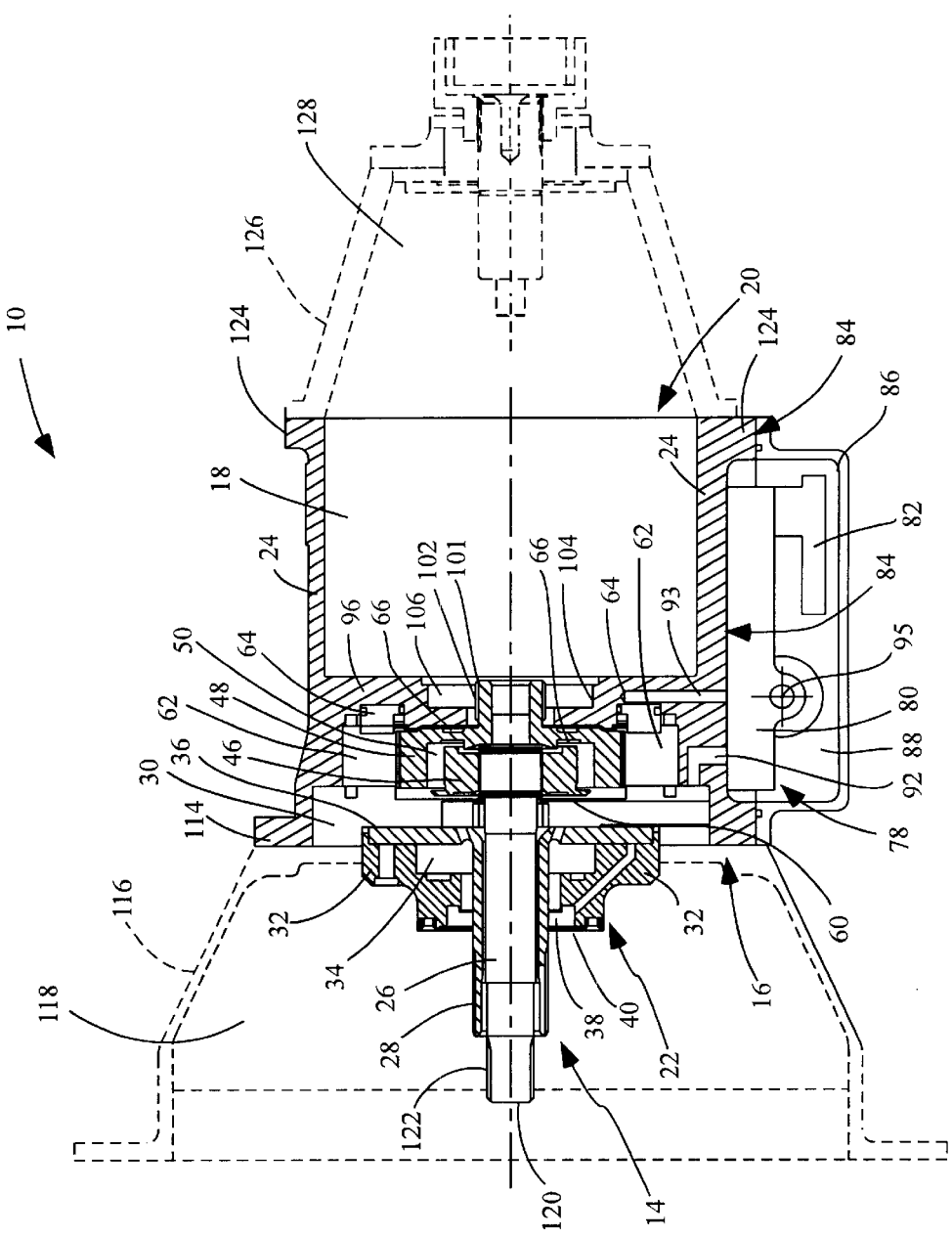
FIG. 1 is a side elevation view in cross section of one presently preferred embodiment of an automotive transmission in accordance with the present invention.
Figure 2A:
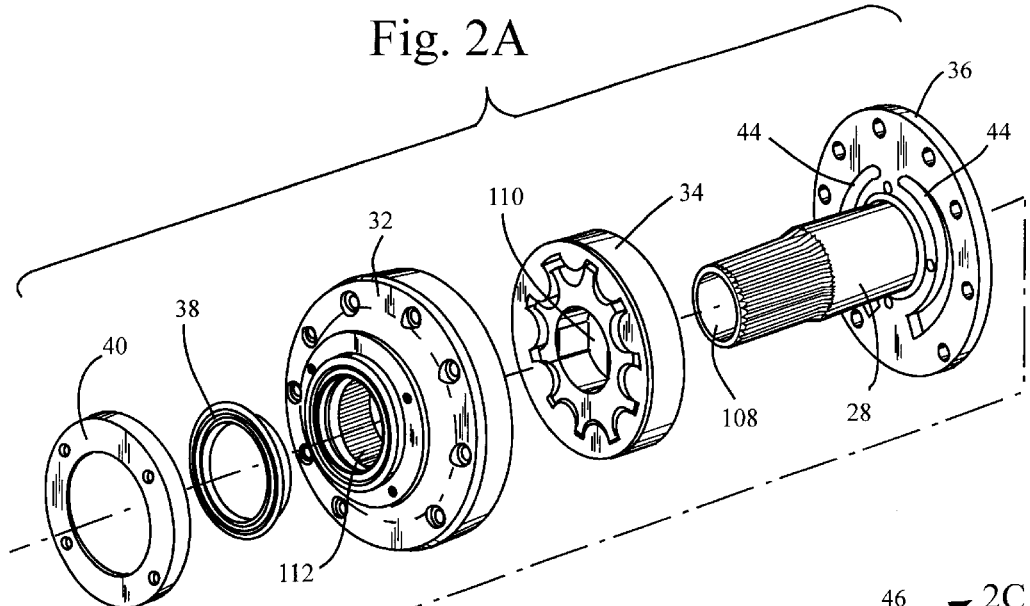
FIG. 2A through FIG. 2D provide an exploded view of the input assembly, pump assembly, sprag clutch assembly and brake assembly of the automotive transmission of FIG. 1.
Figure 2B:
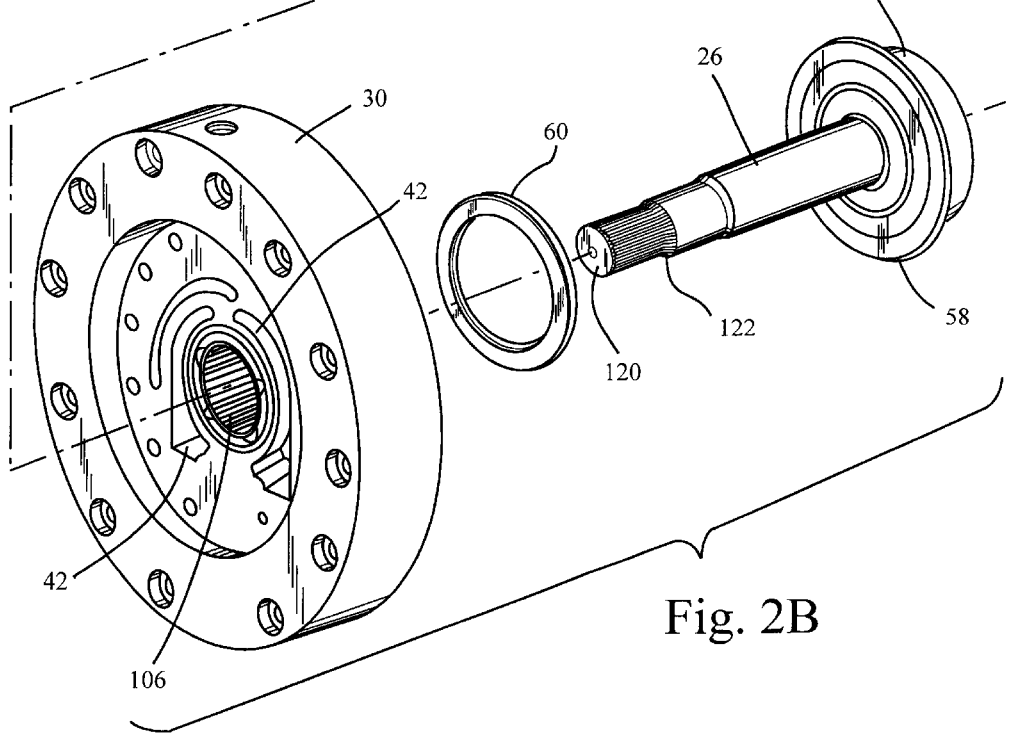
Figure 2C:
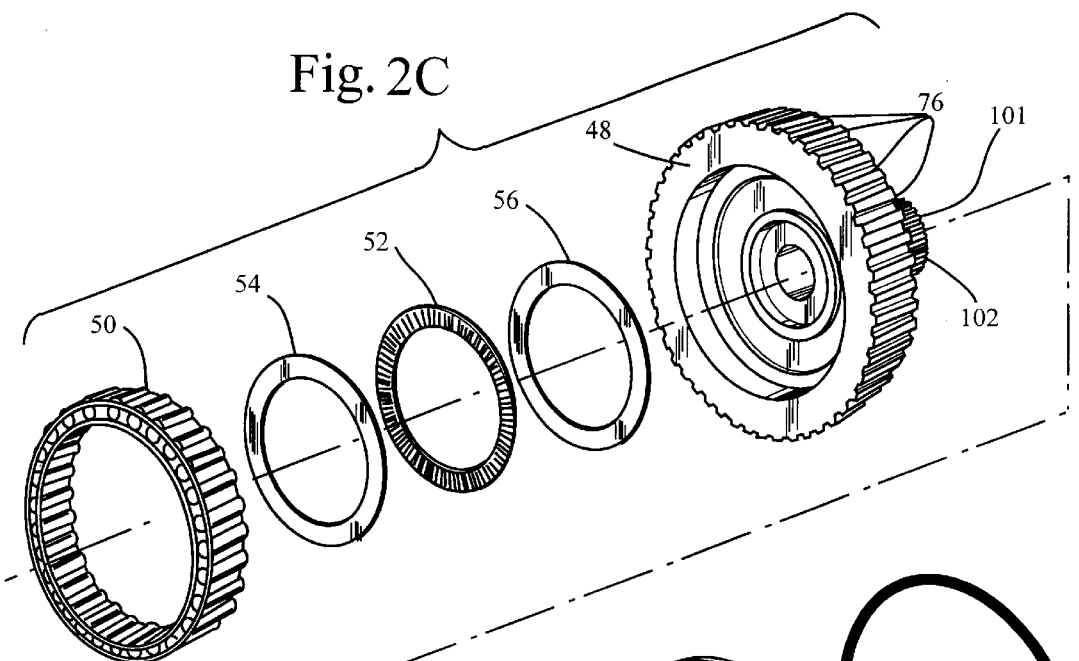
Figure 2D:
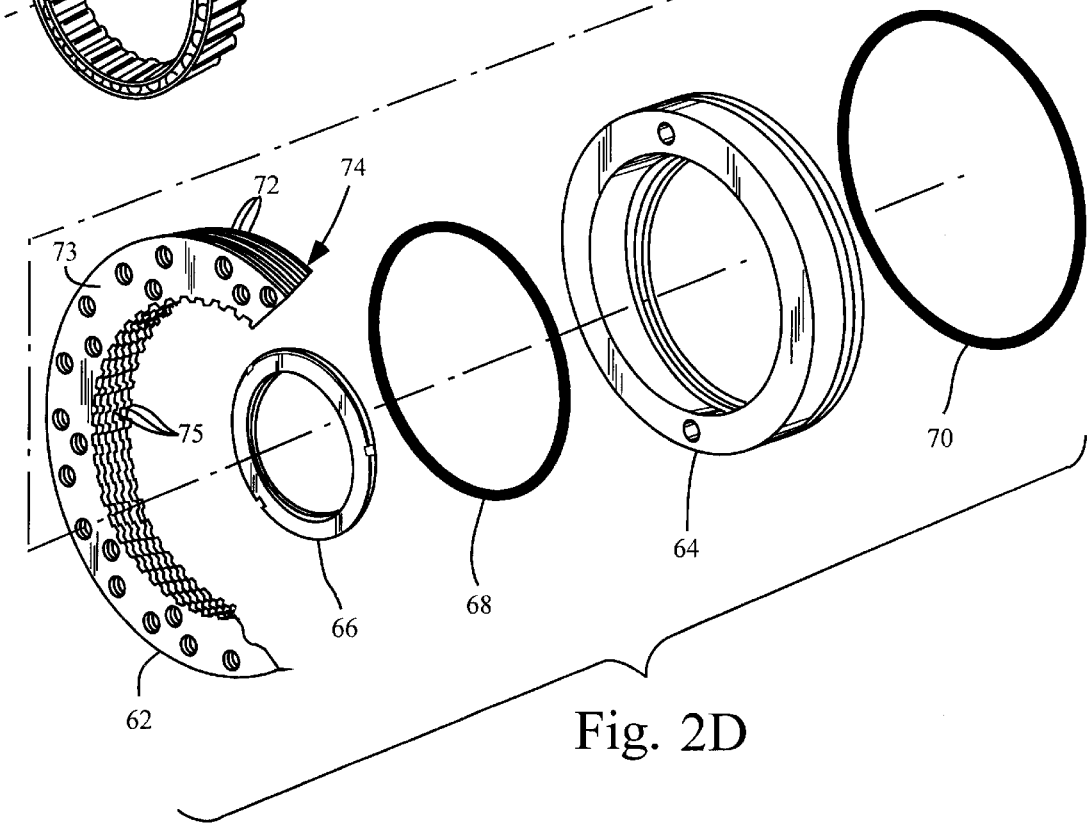
Figure 3:
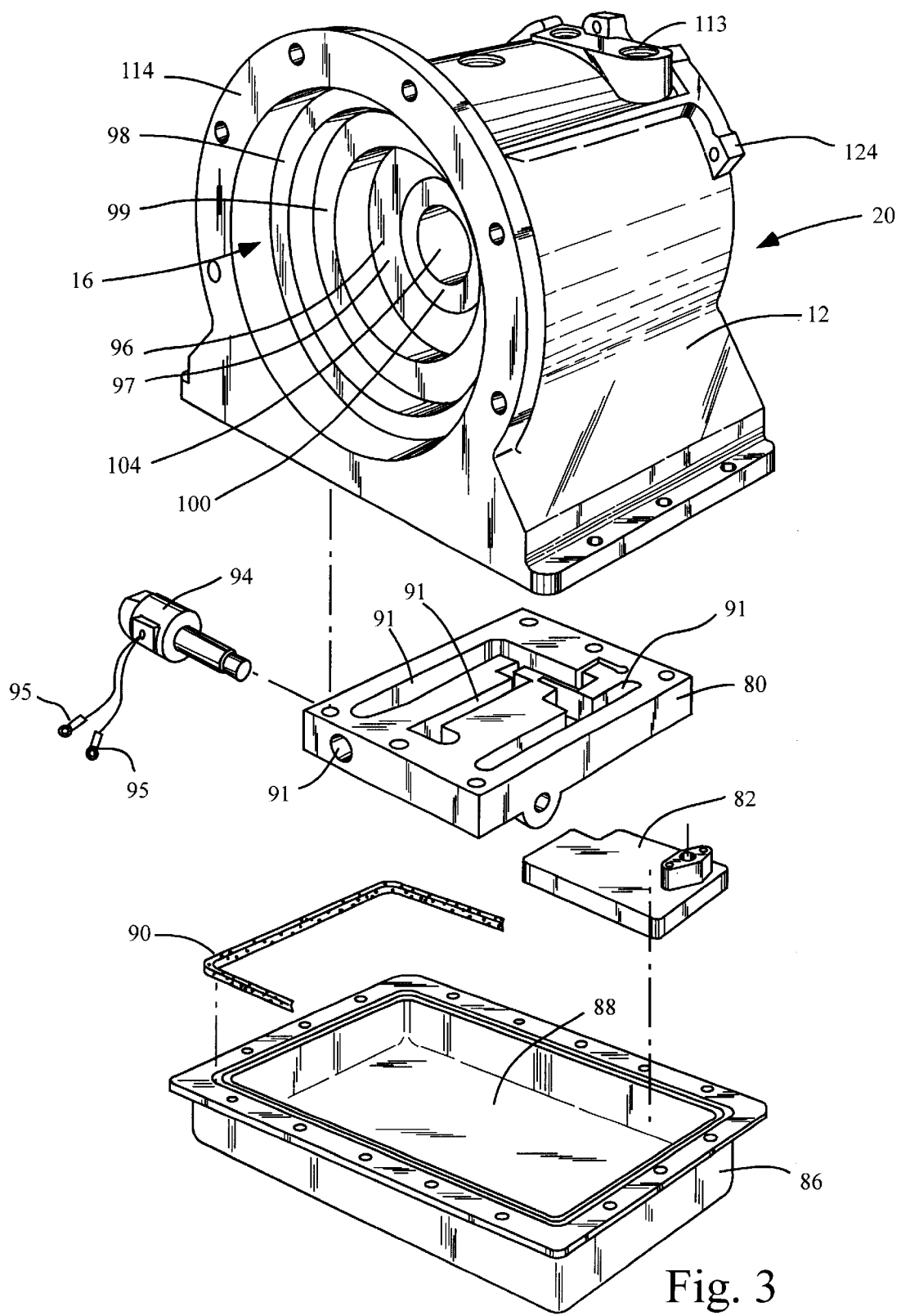
FIG. 3 is an exploded view of the housing, valve body, oil-pan and trans-brake solenoid of the automotive transmission of the invention.

Referring more specifically to the drawings, for illustrative purposes the present invention is embodied in the apparatus shown generally in FIG. 1 through FIG. 3. It will be appreciated that the apparatus may vary as to configuration and as to details of the parts without departing from the basic concepts as disclosed herein. The invention is disclosed generally in terms of use with racing automotive vehicles. However, it will be readily apparent to those skilled in the art that the invention may be used in other types of vehicles and for other applications.

Referring now to FIG. 1 through FIG. 3, an automotive transmission 10 in accordance with the invention is shown. The transmission 10 includes a transmission case or housing 12 which preferably comprises a single, integral metal piece. A drive assembly 14, is mounted generally in a front end 16 of transmission case 12, and a planetary gear set 18 is mounted generally in a back end 20 of case 12 and is operatively coupled or mechanically interfaced to the drive assembly 14. A fluid pump assembly 22 is associated with drive assembly 14.

The planetary gear set 18 is contained within walls 24 of case 12 proximate the back end 20 thereof. Planetary gear set 18 preferably comprises a commercially available gear set such as that available from Lenco, Inc, or other conventional planetary gear set. The nature of planetary gear sets is well known in the art and are not described in detail herein. To avoid overcomplication of the drawings, the details of planetary gear set 18 are omitted from the drawings.

The drive assembly 14 includes generally a rotatable input shaft 26, a stator support 28, and a front mounting plate 30.

Fluid pump assembly 22 preferably comprises a fluid pump housing 32 and associated pump gear set 34. Pump housing 32 is mounted adjacent a flange 36 on stator support 28, with pump gear set 34 held between flange 36 and pump housing 32. A seal 38 is held to pump housing 32 by a seal retainer element 40. The flange 36 of stator support 28 is coupled to front plate 30. Fluid passages or channels 42 (FIG. 2B) in front plate 30 communicate with corresponding fluid passages or channels 44 (FIG. 2A) in flange 36, which in turn are in fluid communication with pump gear set 34 in pump housing 32. Passages 42, 44 allow fluid flow from a fluid reservoir and valve assembly, described below, to fluid pump assembly 22.

Drive assembly 14 also preferably comprises a safety sprag assembly which includes an inner sprag race 46 which is coupled to input shaft 26, an outer sprag race 48 which couples to planetary gear set 18, and a sprag or "one-way" clutch 50 positioned between the inner and outer sprag races 46, 48. Sprag clutch 50 includes a thrust bearing set 52 (FIG. 2C) and thrust washers or retainers 54, 56. The sprag clutch assembly is mounted to transmission case 12 proximate front end 16 by front plate 30, which couples to front end 16 to hold the sprag clutch assembly in place. A flange 58 is included on inner sprag race which holds sprag clutch 50 in place between inner and outer sprag races 46, 48. Flange 58 also holds thrust bearing set 60 in place against front plate 30.

Sprag clutch 50 and inner and outer sprag races 46, 48 are structured and configured such that rotational energy from input shaft 26 and inner sprag race 46 is transferred to outer sprag race 48 and hence to planetary gear set 18 only in one rotational direction. This arrangement provides an anti-lockup safety feature which avoids or prevents vehicle crashes, as related further below.

The invention includes a brake assembly, provided by a transbrake clutch pack 62 and brake piston 64, which are configured to apply a braking force upon drive assembly 14 when activated by a user. A thrust bearing set 66 and o-ring seals 68, 70 (FIG. 2D) are included in association with clutch pack 62 and piston 64. Transbrake clutch pack 62 includes a plurality of friction plates 72 (FIG. 2D) positioned between separator plates 73, 74. Friction plates 72 include serrated inner edges 75 that are structured and configured to reversibly engage outer sprag race, which includes corresponding serrations 76 (FIG. 2C) in its outer surface. Front plate 30 is configured to retain the brake assembly of the invention within transmission case 12 as well as the drive assembly described above.

A valve assembly 78 is provided with the invention, and preferably is located externally with respect to transmission case for easy repair access. The valve assembly 78 comprises a valve body 80 an a fluid or oil pickup 82 together with a fluid screen (not shown). Valve body 80 preferably is coupled to a lower side 84 of transmission case 12, with pickup 82 coupled to valve body 80. An oil pan 86, which defines a fluid reservoir 88, is coupled to the lower side 84 of transmission case 12. A gasket or seal 90 (FIG. 3) is positioned between oil pan 84 and case 12.

Valve body 80 includes a plurality of fluid channels or passages 91 which define generally a plurality of valves (not shown). Fluid channels 91 communicate with corresponding fluid passages 92 (FIG. 1) of transmission case 12 which in turn are in flow communication with fluid passages 42, 44 in flange 36 and front plate 30 to allow fluid passage between valve body 80 and pump assembly 22 and provide fluid pressure to a torque converter. Fluid channels 91 also communicate with fluid passages 93 (FIG. 1) in transmission case 12 to provide fluid pressure to the brake assembly of the invention. The valves defined by channels 91 regulate fluid pressure associated with the fluid coupling to the torque converter, as related further below.

Valve assembly 78 also includes a brake valve in the form of a transbrake solenoid element 94 which is mounted in valve body 80. Transbrake solenoid 94 regulates delivery of pressurized fluid through channels 93 in case 12 to brake piston 64, for applying transbrake clutch pack 62 to outer sprag race 48. Electrical leads 95 are operatively coupled to a conventional user-actuated control mechanism (not shown) to allow selective application of transbrake clutch pack 62 on outer sprag race 48 according to user input.

Transmission case 12 includes a partition or wall 96 which generally defines and separates the front and back ends 16, 20 of case 12, with the front surface of partition 96 being structured and configured to accommodate the drive assembly and brake assembly of the invention. Partition 96 preferably defines several concentric steps or platforms facing the front end 16 of case 12, as seen most clearly in FIG. 3. Partition 96 includes an innermost step or platform 97 (FIG. 3), an outermost platform 98, and a middle platform or step 99, positioned between inner and outer steps 97, 98. An annular lip or wall 100 is positioned adjacent inner step 97. Brake piston 64 fits over annular wall 100 and against inner step 97. Separator plate 74 of clutch pack 62 is pinned to middle step 99, and front plate 30 couples to outer step 98.

In assembly of the transmission of the invention, brake piston 64 is positioned around annular wall 100 and against inner step 97 of partition 96. Thrust bearing 60 fits against annular wall 100, and the outer sprag race 48 is positioned adjacent thrust bearing 60. Outer sprag race 48 includes a stub or protrusion 101 with a plurality of splines 102 thereon. The stub portion 101 of outer sprag race 48 extends through an opening 104 in partition 96. Opening 104 is surrounded by annular wall 100, as seen most clearly in FIG. 3. Stub 101 on outer sprag race 48 matingly engages a corresponding receiver 106 in planetary gear set 18, so that rotational power can be transferred from outer sprag race 48 to planetary gear set 18. Brake piston 64 fits over annular wall 100 and fits against the innermost step 97 of partition 96. Transbrake clutch pack 62 fits against middle step 99 of partition 96, with separator plate 74 adjacent to step 99. In this manner clutch pack 62 is positioned adjacent brake piston 64 and circumferentially about outer sprag race 48. Thrust bearing 52 and washers 54, 56, together with sprag clutch 50, fit within outer sprag race 48 as shown in FIG. 2C, and inner sprag race 46 fits within sprag clutch 50, as seen most clearly in FIG. 1. Front plate 30 secures to the outermost step 98 of partition 96 adjacent to the outer separator plate 73, so that front plate 30 holds the drive and brake assemblies in place, with input shaft 26 extending out through bore 106 (FIG. 2B) in front plate 30.

Stator support 28 fits over drive shaft 26, with drive shaft 26 rotatably received within a bore 108 (FIG. 2A) in stator support 28. Flange 36 on stator support 28 is then coupled to front plate 30 with fluid channels 42, 44 suitably aligned. Fluid pump gear set 34 and pump housing 32 fit over input shaft 26 and surrounding stator support 28, which extend through bore 110 (FIG. 2A) in pump gear set 34 and bore 112 in pump housing 32. Fluid pump housing 32 is then coupled to flange 36 on stator support 28, and seal 38 and retainer 40 are fitted over input shaft 26 and stator support 28 and secured to pump housing 32. Valve body 80 is coupled to lower surface 84 of transmission case 12, and oil pickup 82 is coupled to valve body 80, as noted above. Oil pan 86 is coupled to lower side 84 of case 12, and reservoir 88 is filled with oil or other suitable lubricating fluid (not shown) via fill hole (also not shown) in case 12, which communicates with reservoir 88. A shift tower 113 is provided in case 12 for planetary gear set 18.

Transmission case 12 includes a flange 114 adjacent front end 16 which allows a bell-housing 116 (FIG. 1) to be coupled thereto. A torque converter 118, is accommodated by bell housing 116, and is coupled to the end 120 of input shaft 26 by means of splines 122. A variety of torque converters may be used with the invention. Such torque converters are well known in the art, and the details of torque converter 118 accordingly are not disclosed in detail herein, and the details of torque converter 118 are omitted from the drawings to avoid unnecessary complexity in the drawings. One preferred torque converter suitable for use with the present invention is disclosed in a co-pending U.S. patent application Ser. No. 09/640,483 entitled "TORQUE CONVERTER FOR RACING AUTOMOBILES", filed concurrently herewith by inventors Dan Hughes and Jack Shell.

Transmission case 12 also includes a flange or lip 124 proximate back end 20, to which a reverser housing 126 is coupled. A reverser assembly 128 is accommodated within reverser housing 126, and is operatively coupled to planetary gear set 18 in a conventional manner. Reverser assemblies are also well known in the art, and the details of reverser assembly 128 are omitted to prevent overcomplication of the disclosure and drawings.

In operation, rotational energy is transferred from a vehicle engine to the turbine (not shown) of torque converter 118 to input shaft 26 and attached inner sprag race 46, through sprag clutch 50 to outer sprag race 48, causing outer sprag race 48 to rotate with the turbine of torque converter 118. Outer sprag race 48 is directly coupled to planetary gear set 18, as noted above, and correspondingly applies rotational energy to planetary gear set 18. If the vehicle engine should stop rotating while the vehicle is in motion, (either through the driver releasing the throttle to the idle position or because of an engine failure), the sprag clutch 50 will allow the outer sprag race 48 to be mechanically released from the turbine of the torque converter 118, allowing the wheels of the vehicle to continue to rotate unhindered. In this manner, accidents which may occur do to locking of the vehicle wheels are avoided.

Also during operation, fluid (not shown) is pumped from reservoir 88 through oil pickup 82, valve body 80, the case 12, and a front plate 30 into pump assembly 22, which is positioned adjacent stator support 28 as noted above. The fluid then returns from pump assembly 22 under pressure back through the front plate 30, the case 12, and into the valve body 80 where the pressure is regulated by means of a spring and spool valves (not shown) within valve body 80 to a predetermined fluid pressure. This fluid then travels back into the case 12, the front plate 30, through the flange 36 on stator support 28 and into the torque converter 118, providing a fluid medium for fluid coupling of the torque converter 118.

Transbrake solenoid 95 regulates flow of fluid from valve body 80 to fluid passage 96 and brake piston 64. When actuated, the solenoid 95 moves and allows fluid under pressure to reach transmission brake piston 64, causing the piston 64 to move and lock a transmission brake clutch pack 62. The transmission brake clutch pack 62 is located circumferentially about the outer sprag race 48 as related above, and the friction plates 72 of the transmission brake clutch pack 62 are loosely splined to the outer sprag race 48. When the transmission clutch pack 62 is thus locked, the outer sprag race 48 is prevented from rotating, thus holding the vehicle stationary, allowing full power from the engine to be applied to the torque converter 118. When the transmission brake clutch pack 62 is released, the vehicle will achieve its maximum acceleration.

The user or driver operates the transmission 10 of the invention by pressing a button (not shown) connected electrically to the transbrake solenoid valve 95, which locks the transmission brake pack 62, stopping the rotation of the input shaft 26 and the planetary gear set 18 of the transmission 10. The driver can then shift the reverser 128 from neutral into forward or reverse gear. The driver, after reaching the starting line, would then activate the transmission brake pack 62 which would hold the vehicle stationary while the driver applies power from the engine. Upon release of the transmission brake pack 62, the vehicle will quickly achieve its maximum possible acceleration rate. In the event of an engine failure the sprag clutch 50 will release, allowing the crankshaft of the engine to stop rotating while the vehicle coasts to a stop.

Locating the transmission brake clutch pack 62 around the outer perimeter of the outer sprag race 48 allows the transmission 10 of the invention to be as compact as possible while allowing the largest and strongest possible transmission brake clutch pack 62. This arrangement eliminates the need for a separate output shaft and inner transmission brake clutch hub, which have made previously available drive systems long and bulky. By locating the planetary gear set 18 in a common transmission case 12 with the other components of transmission 10, the transmission 10 of the invention is even more compact and light weight.

By locating the valve assembly externally with respect to the transmission case, all of the control valves associated with valve body 80 are quickly and easily accessible for servicing and repair. In the presently preferred embodiment, valve body 80 is coupled to the lower surface 84 of transmission case 12 as noted above, and can be accessed by simple removal of oil pan 86, thereby eliminating the need for removal of the entire assembly from the vehicle for servicing.

The reverser assembly 128 is directly mounted to the rear end 20 of the transmission case 12. By removing the reverser assembly 128 and reverser housing 126, quick and easy access to the transmission planetary gear set 18 for service or the changing of gear ratios is provided. Also, by removing the reverser 128, additional racing planetary gear assemblies (not shown) can be mounted to the rear 20 of the transmission case 12, thereby converting the transmission 10 from the standard two-speed unit to one of three, four, or five forward speeds. The reverser 128 would then be remounted to the final planetary assembly.

While use of a safety sprag clutch with the invention is generally preferred, this safety feature may be omitted in certain uses of the invention where lock-up is not a concern. In this regard, inner sprag race 46 and sprag clutch 50 may be omitted, and outer sprag race 48 may be coupled directly to input shaft 26. This arrangement reduces the cost and complexity of the transmission 10.

The components of the transmission apparatus 10 described herein are preferably made of cast and/or machined steel, aluminum or other metal or metal alloy as is well known in the art.

Accordingly, it will be seen that the present invention provides a transmission for racing automobiles which is compact and lightweight, which prevents locking up of vehicle wheels during engine failures, and which provides for easy servicing and maintenance without requiring removal from a vehicle or substantial disassembly. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. An automotive transmission, comprising:
   (a) a transmission case;
   (b) a drive assembly including an input shaft, said drive assembly located proximate a front end of said transmission case;
   (c) a brake assembly positioned to apply a braking force on said drive assembly assembly;
   (d) a planetary gear set located proximate a back end of said transmission case and operatively coupled to said drive assembly;
   (e) a fluid pump assembly associated with said input shaft; and
   (f) a valve assembly, positioned externally from said transmission case and in fluid flow communication with said fluid pump assembly, said valve assembly configured to regulate fluid pressure associated with said fluid pump assembly.

2. The automotive transmission of claim 1, wherein said drive assembly comprises a sprag clutch assembly including an inner sprag race coupled to said input shaft, an outer sprag race coupled to said planetary gear set, and a sprag clutch positioned between said inner sprag race and said outer sprag race.

3. The automotive transmission of claim 1, wherein said valve assembly comprises a valve body located on a lower side of said transmission casing and housed within an oil pan coupled thereto, said oil pan defining a fluid reservoir around said valve body.

4. The automotive transmission of claim 3, wherein said valve assembly further comprises an oil pickup coupled to said valve body.

5. The automotive transmission of claim 3, wherein said valve assembly further comprises a brake valve mounted in said valve body and configured to apply fluid pressure to said brake assembly.

6. The automotive transmission of claim 3, wherein said valve assembly further comprises valving configured to regulate fluid pressure to a torque converter.

7. The automotive transmission of claim 2, wherein said brake assembly comprises a transbrake clutch pack configured to apply a braking force to said outer sprag race.

8. An automotive transmission, comprising:
   (a) a transmission case;
   (b) a safety sprag assembly located proximate a front end of said transmission case;
   (c) a brake assembly positioned to apply a braking force on said safety sprag assembly;
   (c) a planetary gear set located proximate a back end of said transmission case and operatively coupled to said safety sprag assembly;
   (d) an input shaft located proximate said front end of said transmission case and operatively coupled to said safety sprag assembly;
   (e) a fluid pump assembly associated with said input shaft; and
   (f) a valve assembly externally located with respect to said transmission case and configured to regulate fluid pressure associated with said fluid pump assembly.

9. The automotive transmission of claim 8, wherein said safety sprag assembly comprises an inner sprag race connected to said input shaft, an outer sprag race connected to said planetary gear set, and a sprag clutch positioned between said inner sprag race and said outer sprag race.

10. The automotive transmission of claim 8, wherein said valve assembly comprises a valve body positioned on a lower side of said transmission casing and housed within an oil pan coupled thereto, said oil pan defining a fluid reservoir around said valve body.

11. The automotive transmission of claim 10, wherein said valve assembly further comprises a brake valve mounted in said valve body and configured to apply fluid pressure to said brake assembly upon activation thereof by a user.

12. The automotive transmission of claim 11, wherein said valve assembly further comprises valving configured to regulate fluid pressure to a torque converter.

13. The automotive transmission of claim 9, wherein said brake assembly comprises a transbrake clutch pack configured to apply a braking force to said outer sprag race.

14. The automotive transmission of claim 8, further comprising a reverser assembly coupled to said planetary gear set proximate said back end of said transmission case.

15. An automotive transmission, comprising:
   (a) a transmission case;
   (b) an input shaft positioned adjacent a front end of said transmission case and configured to engage a torque converter;
   (c) an inner sprag race coupled to said input shaft;
   (d) a sprag clutch positioned circumferentially around said inner sprag race;
   (e) an outer sprag race positioned circumferentially around said sprag clutch;
   (f) a transbrake clutch pack circumferentially positioned around said outer sprag race;
   (g) a planetary gear set located proximate a back end of said transmission case and connected to said outer sprag race;
   (h) a fluid pump assembly associated with said input shaft; and
   (i) a valve body externally mounted on a lower side of said transmission case, said valve body in fluid communication with said fluid pump assembly and configured to regulate fluid pressure associated with said fluid pump assembly, said transbrake clutch pack and said torque converter.

16. The automotive transmission of claim 1, further comprising an oil pan externally mounted on said lower side of said transmission case, said oil pan defining a fluid reservoir, said valve body positioned within said oil pan and said fluid reservoir.

17. The automotive transmission of claim 16, wherein said valve assembly further comprises an oil pickup coupled to said valve body.

18. The automotive transmission of claim 3, wherein said valve assembly further comprises a transbrake solenoid valve mounted in said valve body and configured to apply fluid pressure to said transbrake clutch pack.

19. The automotive transmission of claim 3, wherein said valve assembly further comprises valving configured to regulate fluid pressure to said torque converter.

20. The automotive transmission of claim 15, further comprising a reverser assembly coupled to said planetary gear set proximate said back end of said transmission case.

* * * * *